United States Patent
Robinette et al.

(10) Patent No.: US 8,585,521 B2
(45) Date of Patent: Nov. 19, 2013

(54) VARIABLE RATIO POWER-SPLIT HYBRID TRANSMISSION

(75) Inventors: Darrell Lee Robinette, Fenton, MI (US); Clyde A. Bulloch, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 404 days.

(21) Appl. No.: 13/048,979

(22) Filed: Mar. 16, 2011

(65) Prior Publication Data
US 2012/0238385 A1    Sep. 20, 2012

(51) Int. Cl.
*B60K 1/00*    (2006.01)

(52) U.S. Cl.
USPC .............. 475/5; 475/269; 475/296; 475/302; 180/65.1; 180/65.21; 180/65.31; 180/65.6; 180/65.7

(58) Field of Classification Search
USPC .......... 475/5, 269, 296, 302; 180/65.1, 65.21, 180/65.31, 65.6, 65.7
See application file for complete search history.

(56) References Cited

U.S. PATENT DOCUMENTS

| | | | |
|---|---|---|---|
| 7,192,373 B2 * | 3/2007 | Bucknor et al. | 475/5 |
| 8,317,648 B2 * | 11/2012 | Robinette et al. | 475/317 |
| 8,435,147 B2 * | 5/2013 | Kim et al. | 475/5 |
| 2006/0229153 A1* | 10/2006 | Bucknor et al. | 475/5 |
| 2008/0248909 A1* | 10/2008 | Raghavan et al. | 475/5 |
| 2009/0111635 A1* | 4/2009 | Conlon et al. | 475/5 |
| 2009/0157269 A1* | 6/2009 | Matsubara et al. | 701/54 |
| 2011/0256974 A1* | 10/2011 | Okuwaki | 475/5 |
| 2012/0149513 A1* | 6/2012 | Robinette et al. | 475/5 |

* cited by examiner

*Primary Examiner* — Derek D Knight
(74) *Attorney, Agent, or Firm* — Quinn Law Group, PLLC

(57) ABSTRACT

A transmission includes a first motor/generator with a first rotor connected for rotation with a first member of a first planetary gear set. A second electric motor/generator has a second rotor connected for rotation with a second member of the first planetary gear set. The second member of the first planetary gear set is connected for common rotation with the output member. The first member of a second planetary gear set rotates with the input member, and the third member of the second planetary gear set is grounded to a stationary member. A first torque-transmitting mechanism establishes torque flow between the first member of the second planetary gear set and the third member of the first planetary gear set. A second torque-transmitting mechanism establishes torque flow between the second member of the second planetary gear set and the third member of the first planetary gear set.

16 Claims, 2 Drawing Sheets

US 8,585,521 B2

VARIABLE RATIO POWER-SPLIT HYBRID TRANSMISSION

TECHNICAL FIELD

The invention relates to a hybrid electro-mechanical transmission.

BACKGROUND

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and an electrically-variable operating mode are established by engaging brakes and/or clutches in different combinations and controlling the engine and motor/generators. The various operating modes are advantageous, as they may be used to improve fuel economy.

SUMMARY

A transmission is provided having two different ratios at which power is split in electrically-variable operating modes. The transmission includes an input member, an output member, and a stationary member. Additionally, the transmission has a first and a second planetary gear set each having a first member, a second member and a third member. A power-split unit of the transmission includes the first planetary gear set as well as a first electric motor/generator and a second electric motor/generator. The first motor/generator has a first rotor connected for rotation with the first member of the first planetary gear set and a first stator grounded to the stationary member. The second electric motor/generator has a second rotor connected for rotation with the second member of the first planetary gear set and a second stator grounded to the stationary member. The second member of the first planetary gear set is connected for common rotation with the output member. A ratio-changing unit of the transmission includes the second planetary gear set as well as a first and a second torque-transmitting mechanism. The first member of the second planetary gear set is connected for common rotation with the input member, and the third member of the second planetary gear set is grounded to the stationary member. The first torque-transmitting mechanism is selectively engageable to establish torque flow between the first member of the second planetary gear set and the third member of the first planetary gear set. The second torque-transmitting mechanism is selectively engageable to establish torque flow between the second member of the second planetary gear set and the third member of the first planetary gear set. The first and second torque-transmitting mechanisms along with the second planetary gear set thereby provide two different speed ratios between the input member and the third member of the first planetary gear set. The torque-transmitting mechanisms are engaged in order to establish different speed ratios into the power-split unit of the transmission, thereby allowing the speeds of the rotors of the motor/generators to remain within a predetermined speed range at which the motor/generators are sufficiently efficient.

The above features and advantages and other features and advantages of the present invention are readily apparent from the following detailed description of the best modes for carrying out the invention when taken in connection with the accompanying drawings.

DETAILED DESCRIPTION

Figure 1:
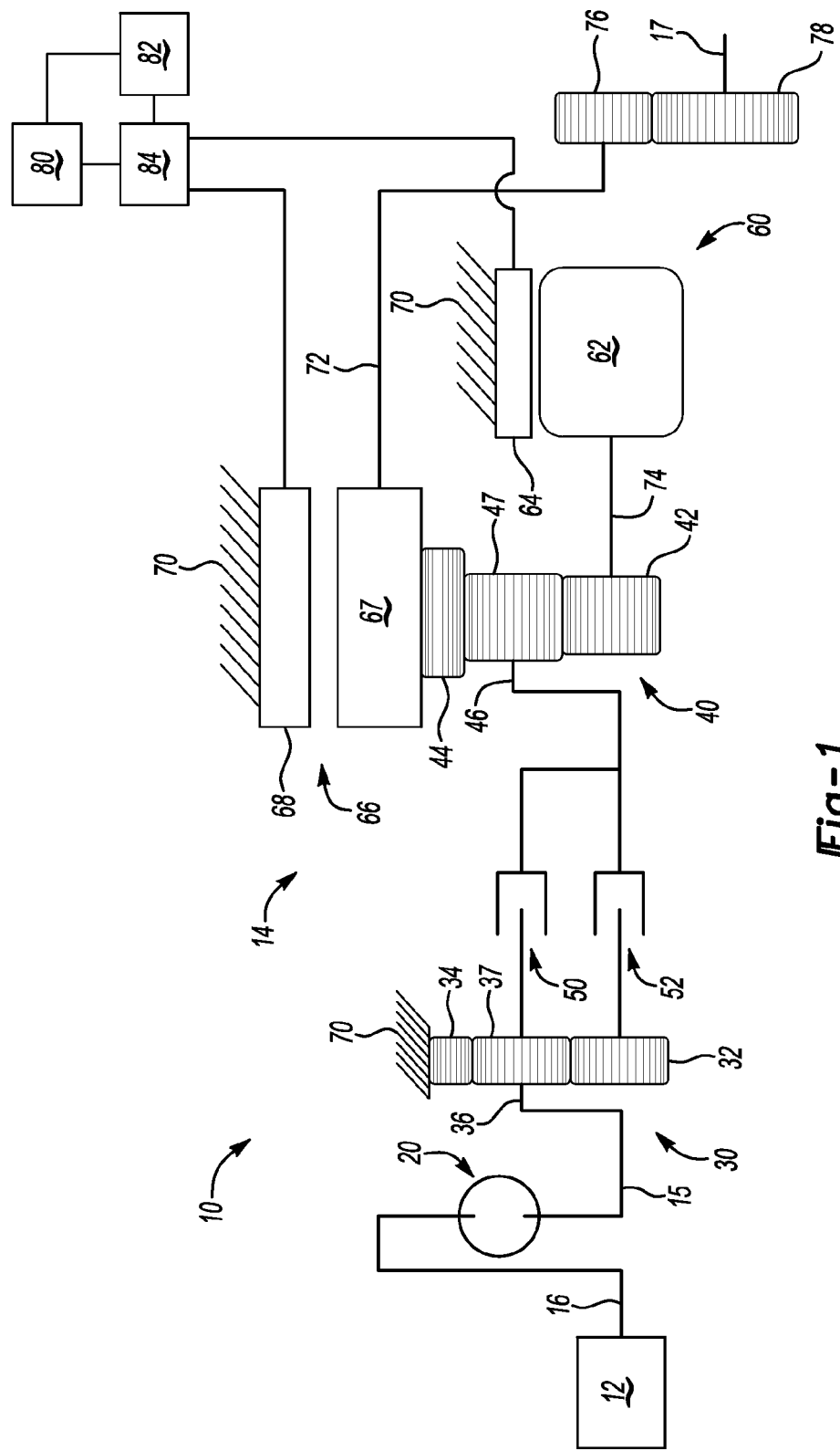
FIG. 1 is a schematic illustration of a powertrain having a first embodiment of an input-split hybrid transmission.

Referring to the drawings, wherein like reference numbers refer to like components throughout the several views, FIG. 1 shows a powertrain 10 for a vehicle that includes an engine 12 and a hybrid transmission 14. The transmission 14 has an input member 15 to which an engine output member 16 is connected through a damping mechanism 20. As used herein, an "engine" includes any power source connected for providing torque at the input member 15 that is not powered by electrical power. For example, the engine 12 may be an internal combustion engine such as a gasoline or diesel engine.

The transmission 14 includes a planetary gear set 30 that has a sun gear member 32, a ring gear member 34 and a carrier member 36 that supports pinion gears 37 that mesh with the sun gear member 32 and the ring gear member 34. The carrier member 36 is connected for common rotation with the input member 15. As used herein, the planetary gear set 30 is referred to as the second planetary gear set. The carrier member 36 is the first member, the sun gear member 32 is a second member, and the ring gear member 34 is the third member of the planetary gear set 30.

The transmission 14 has a planetary gear set 40 with a sun gear member 42, a ring geared member 44, and a carrier member 46 that supports pinion gears 47 that mesh with the sun gear member 42 and the ring gear member 44. As used herein, the planetary gear set 40 is referred to as the first planetary gear set. The sun gear member 42 is the first member, the ring gear member 44 is the second member, and the carrier member 46 is the third member of the planetary gear set 40.

A first torque-transmitting mechanism 50 is selectively engageable to transfer torque from the input member 15 and the carrier member 36 to the carrier member 46 in a 1:1 ratio. A second torque-transmitting mechanism 52 is selectively engageable to transfer torque from the sun gear member 32 to the carrier member 46. A ratio between the speed of rotation of the carrier member 46 and the speed of rotation of the input member 15 and the carrier member 36 depends on the gear tooth counts of the planetary gear set 30.

The transmission 14 has a first motor/generator 60 with a first rotor 62 having a rotor hub 74 connected for rotation with the sun gear member 42. A stator 64 is grounded to a stationary member 70, which is a nonrotating member such as a casing of the transmission 14. The transmission 14 also has a second motor/generator 66 with a second rotor 67 connected for rotation with an output member 72 and with the ring gear member 44. A stator 68 is grounded to the stationary member 70. The output member 72 is connected for common rotation with a gear member 76 of a final drive gearing arrangement. The final drive gear arrangement also includes gear 78 that meshes with gear 76 and is connected for rotation with a shaft 17 that drives vehicle wheels (not shown).

An energy storage device, such as a battery 80, is operatively connected by transfer conductors to the stators 64, 68. A controller 82 controls electrical transfer between the battery 80 and the stators 64, 68 through a power inverter 84 that changes direct current provided by the battery 80 to alternating current required for operation of the motor/generators 60, 66 (and vice versa when the motor/generators 60, 66 are operable as generators). The controller 82 may also control engagement and disengagement of the torque-transmitting mechanisms 50, 52, or a separate controller may be used for this purpose.

The planetary gear set 40 with the motor/generators 60, 66 is referred to as an input-split power unit, or a power-split unit, because power provided at the carrier member 46 from the engine 12 is split at the planetary gear set 40, with power also provided by or received from the motor/generators 60, 66 to the output member 72.

The planetary gear set 30 with torque-transmitting mechanisms 50, 52 is referred to as a ratio-changing unit, because the speed ratio of the input member 15 to the carrier member 46 (which serves as the input member to the input-split power unit) is changed by changing which of the torque-transmitting mechanisms 50 or 52 is engaged.

The powertrain 10 is operable in several distinct operating modes depending on the engagement status of the torque-transmitting mechanisms 50, 52, the state of the engine 12 (i.e., on or off), and the state of the motor/generators 60, 66 (i.e., whether on, off, and whether each is operated as a motor or a generator). For instance, if both torque-transmitting mechanisms 50, 52 are disengaged, the controller 82 may control both motor/generators 60, 66 to function as motors in a first electric-only operating mode. Torque from motor/generator 60 is added to torque from motor/generator 66 through the planetary gear set 40 to provide torque at the output member 72 and to shaft 17 through the final drive gearing arrangement, gears 76, 78.

The powertrain 10 is also operable in a second electric-only operating mode if both torque-transmitting mechanisms 50, 52 are engaged and the controller 82 controls both motor/generators 50, 52 to function as motors. With both torque-transmitting mechanisms 50, 52 engaged, the engine 12 and the planetary gear set 30 are locked-up so that they are held stationary and provide reaction torque for the motor/generators 60, 66. The motor/generators 60, 66 provide torque at the output member 72 and to the shaft 17 through the final drive gearing arrangement, gears 76, 78.

The powertrain 10 is also operable in two different electrically-variable operating modes. A first electrically-variable operating mode is established when the engine 12 is on, torque-transmitting mechanism 50 is engaged, and the motor/generators 60, 66 are operated as motors or generators depending on the torque and speed requirements at the output member 72 and shaft 17. In the first electrically-variable operating mode, the torque from the engine 12 is provided at the carrier member 46 with no torque multiplication or reduction through the planetary gear set 30; that is, the input member 15 rotates at the same speed as the carrier member 46. Power is split through the planetary gear set 40, as torque is provided to or from the first motor/generator 60 at the sun gear member 42 and to or from the second motor/generator 66 at the ring gear member 44. The first electrically-variable operating mode is thus an input-split operating mode.

A second electrically-variable operating mode is established when the engine 12 is on, torque-transmitting mechanism 52 is engaged, and the motor/generators 60, 66 are operated as motors or generators depending on the torque and speed requirements at the output member 72 and the shaft 17. In the second electrically-variable operating mode, the torque from the engine 12 is provided at the carrier member 46 at a gear ratio established through the planetary gear set 30. Power is split through the planetary gear set 40, as torque is provided to or from the first motor/generator 60 at the sun gear member 42 and to or from the second motor/generator 66 at the ring gear member 44. The second electrically-variable operating mode is thus an input-split operating mode.

The shift from the first electrically-variable operating mode to the second electrically-variable operating mode may be accomplished by control signals from the controller 82 (or another controller) to the torque-transmitting mechanisms 50, 52 when sensors indicate that the rotational speed of either rotor 62, 67 approaches a predetermined maximum rotational speed beyond which the efficiency of the motor/generators 60, 66 decreases due to increased electrical power requirements. In this embodiment, the gear ratio of the planetary gear set 30 is an overdrive ratio, so that the carrier member 46 rotates faster than the input member 15 when the torque-transmitting mechanism 52 is engaged and torque-transmitting mechanism 50 is not engaged (i.e., speed is multiplied through the planetary gear set 30). Thus, the transmission 14 may be referred to as a variable ratio input-split hybrid transmission.

Figure 2:
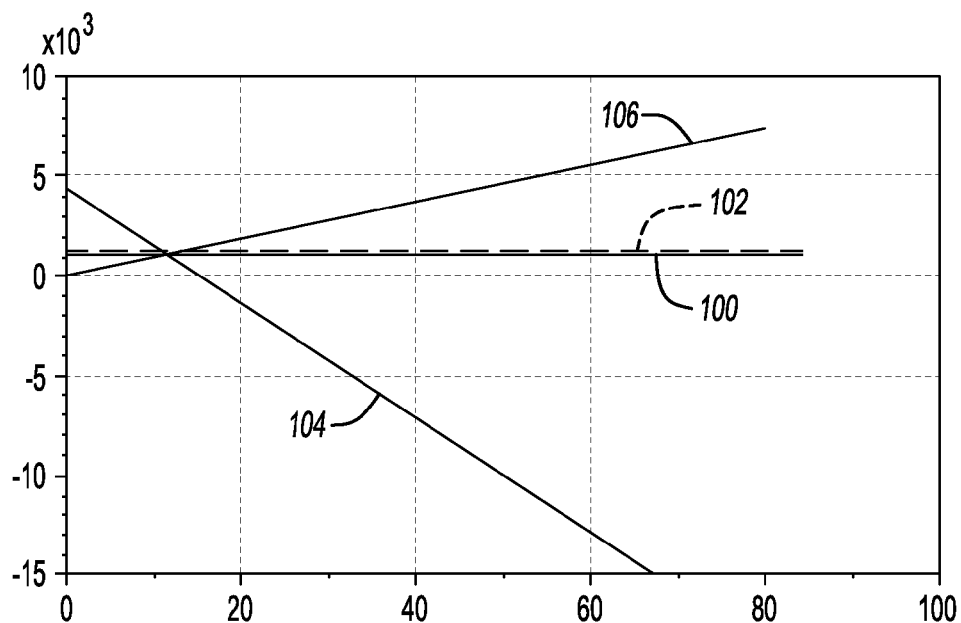
FIG. 2 is a chart of the speeds in revolutions per minute of various components of the powertrain of FIG. 1 versus vehicle speed in miles per hour when a first torque-transmitting mechanism is engaged to establish a first power-split operating mode.
Figure 3:
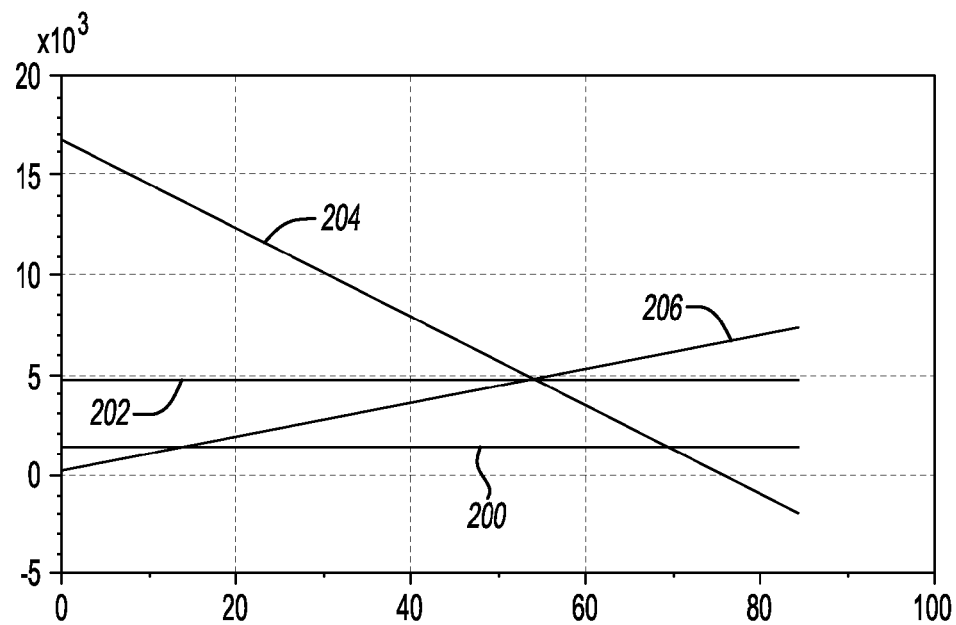
FIG. 3 is a chart of the speeds in revolutions per minute of various components of the powertrain of FIG. 1 versus vehicle speed in miles per hour when a second torque-transmitting mechanism is engaged to establish a second power-split operating mode.

The gear ratio at which torque is provided to the carrier member 46 in the second electrically-variable operating mode increases the speed of rotation of the carrier member 46 relative to the first electrically-variable operating mode. This allows the motor/generators 60, 66 to operate at lower speeds than they would in the first electrically-variable operating mode as the speed of the output member 72 increases. FIGS. 2 and 3 show theoretical speeds in revolutions per minute (rpm) of the engine 12, the rotors 62, 67 and the carrier member 46 versus vehicle speeds in miles per hour (mph) when the powertrain 10 is installed on a typical vehicle. For example, referring to FIG. 2, when the first torque-transmitting mechanism 50 is engaged, the speed of the engine 12 is shown at line 100, and is constant at an optimal operating speed of the engine 12, about 1100 rpm, over the vehicle speed range shown. The speed of the first rotor 62 is shown as line 104, and decreases from about 5500 rpm, then increases after a torque reversal when the vehicle is at about 16 mph. The speed of the second rotor 67 is shown as line 106 and increases from 0 rpm to about 7000 rpm at about 80 mph. The speed of the carrier member 46, represented as line 102, is constant at about 1100 rpm, the same as the speed of the engine 12. The rotor speeds increase in magnitude as the vehicle speeds increase after about 18 mph.

In order to reduce the necessary rotor speeds at higher vehicle speeds, the second torque-transmitting mechanism 52 is engaged when the vehicle speed is between about 30 miles per hour to 60 miles per hour, and likely between 40 miles per hour and 50 miles per hour, depending on gear tooth count selection for the planetary gear sets 30, 40. As can be seen in FIG. 3, the speeds of the rotors 62 and 67, represented by lines 204 and 206, respectively, are lower at higher vehicle speeds when torque-transmitting mechanism 52 is engaged, than when torque-transmitting mechanism 50 is engaged (speeds shown in FIG. 2). The engine 12 is able to remain operating at its optimal operating speed, as represented by line 200. The speed of the carrier member 46, represented by line 202, is greater when the second torque-transmitting mechanism 52 is engaged, than when the first torque-transmitting mechanism 50 is engaged (speed of carrier member 46 shown as line 102 in FIG. 2).

An input-split operating mode is beneficial for efficient operation during high-speed driving, as it allows for reduced motor speeds and decreased power through the electrical power path. That is, all of the mechanical power is not converted to electrical power, then converted again to mechanical power through the motor/generators 60, 66 as is the case in a series operating mode.

The powertrain 10 may also be controlled so that the motor/generator 60 can be operated as a motor to start the engine 12 during an electric-only operating mode by engaging either torque-transmitting mechanism 50 or torque-transmitting mechanism 52. Alternatively, a separate battery (not shown), such as a 12 volt battery, may be used to start the engine 12 with both torque-transmitting mechanisms 50, 52 disengaged and a separate 12 volt starter motor (not shown).

A first fixed ratio is established from the input member 15 to the output member 72 when the first torque-transmitting mechanism 50 is engaged, the second torque-transmitting mechanism is not engaged, the engine 12 is on, and both motor/generators 60, 66 are off (freewheeling). The first fixed ratio is a direct drive ratio, as both planetary gear sets 30, 40 are inactive. The first fixed ratio is advantageous for vehicle launch and low vehicle speeds (i.e., speeds at the output member 72).

A second fixed ratio is established from the input member 15 to the output member 72 when the second torque transmitting mechanism 52 is engaged, the first torque-transmitting mechanism 50 is not engaged, the engine 12 is on, and both motor/generators 60, 66 are off (freewheeling). The second fixed ratio is an overdrive ratio in this embodiment, as the tooth counts of the planetary gear set 30 are selected so that the speed of the carrier member 46 is greater than the speed of the carrier member 36 and the input member 15. The second fixed ratio is advantageous for moderate to high vehicle speeds (i.e., speeds at the output member 72). The planetary gear set 30 thus provides advantages similar to a two-speed transfer case.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a stationary member;
   a first and a second planetary gear set each having a first member, a second member and a third member;
   a power-split unit including the first planetary gear set and having:
      a first electric motor/generator having a first rotor connected for rotation with the first member of the first planetary gear set and a first stator grounded to the stationary member;
      a second electric motor/generator having a second rotor connected for rotation with the second member of the first planetary gear set and a second stator grounded to the stationary member; wherein the second member of the first planetary gear set is connected for common rotation with the output member;
   a ratio-changing unit including the second planetary gear set and having:
      a first torque-transmitting mechanism selectively engageable to establish torque flow between the first member of the second planetary gear set and the third member of the first planetary gear set;
      a second torque-transmitting mechanism selectively engageable to establish torque flow between the second member of the second planetary gear set and the third member of the first planetary gear set; the first and second torque-transmitting mechanisms thereby providing two different speed ratios between the input member and the third member of the first planetary gear set; wherein the first member of the second planetary gear set is connected for common rotation with the input member; and wherein the third member of the second planetary gear set is grounded to the stationary member.

2. The transmission of claim 1, wherein the transmission is operable in a first input-split operating mode when the first torque-transmitting mechanism is engaged; and wherein the transmission is operable in a second power-split operating mode when the second torque-transmitting mechanism is engaged.

3. The transmission of claim 2, wherein the transmission is operable in a first electric-only operating mode when the second motor/generator is operated as a motor and neither of the torque-transmitting mechanisms are engaged; and wherein the transmission is operable in a second electric-only operating mode when the first and the second motor/generators are operated as motors and both of the torque-transmitting mechanisms are engaged.

4. The transmission of claim 1, in combination with an engine; and further comprising:
   a damper connected between the engine and the input member.

5. The transmission of claim 1, wherein the first member of the first planetary gear set is a sun gear member, the second member of the first planetary gear set is a ring gear member, and the third member of the first planetary gear set is a carrier member that supports pinion gears that mesh with the sun gear member and the ring gear member.

6. The transmission of claim 1, wherein the first member of the second planetary gear set is a carrier member, the second member of the second planetary gear set is a sun gear member, and the third member of the second planetary gear set is a ring gear member; wherein the carrier member supports pinion gears that mesh with the sun gear member and the ring gear member.

7. The transmission of claim 1, wherein the first member of the first planetary gear set is a sun gear member, the second member of the first planetary gear set is a ring gear member, and the third member of the first planetary gear set is a carrier member that supports pinion gears that mesh with the sun gear member and the ring gear member; and
   wherein the first member of the second planetary gear set is a carrier member, the second member of the second planetary gear set is a sun gear member, and the third member of the second planetary gear set is a ring gear member; wherein the carrier member supports pinion gears that mesh with the sun gear member and the ring gear member.

8. The transmission of claim 1, further comprising:
   a set of intermeshing gears connected to the output member.

9. The transmission of claim 1, wherein each of the torque-transmitting mechanisms is engaged at respective different predetermined operating conditions selected so that speeds of the first and second rotors remain within a predetermined range of speeds.

10. The transmission of claim 1, in combination with an engine having a rotatable engine output member connected for rotation with the input member via a damper; wherein the first and second torque-transmitting mechanisms are both disengaged to disconnect the engine from the transmission and the first and second motor/generators are operated as motors to establish at least one electric-only operating mode.

11. The transmission of claim 1, in combination with an engine having a rotatable engine output member connected for rotation with the input member; wherein the first and second torque-transmitting mechanisms are both engaged to lock the second planetary gear set and thereby prevent rotation of the engine output member and the first and second motor/generators are operated as motors to establish an electric-only operating mode.

12. The transmission of claim 1, in combination with an engine having a rotatable engine output member operable to provide power to the second planetary gear set;
    wherein the first torque-transmitting mechanism is engaged to establish a first electrically-variable operating mode, with the engine on and the motor/generators functioning as motors or generators; and
    wherein the second torque-transmitting mechanism is engaged to establish a second electrically-variable operating mode, with the engine on and the motor/generators functioning as motors or generators; the first and second electrically-variable operating modes thereby being power-split operating modes with different gear ratios established between the input member and the third member of the first planetary gear set.

13. The transmission of claim 1, in combination with an engine having a rotatable engine output member connected for rotation with the input member; wherein one of the first and second torque-transmitting mechanisms is engaged and the first motor/generator is operated as a motor to start the engine.

14. A transmission comprising:
    an input member;
    an output member;
    a stationary member;
    a first planetary gear set and a second planetary gear set, each planetary gear set having a first member, a second member, and a third member;
    a first electric motor/generator having a first rotor connected for rotation with the first member of the first planetary gear set and a first stator grounded to the stationary member;
    a second electric motor/generator having a second rotor connected for rotation with the second member of the first planetary gear set and a second stator grounded to the stationary member; wherein the second member of the first planetary gear set is connected for common rotation with the output member;
    wherein the first member of the second planetary gear set is connected for common rotation with the input member; wherein the third member of the second planetary gear set is grounded to the stationary member;
    a first torque-transmitting mechanism selectively engageable to establish torque flow between the first member of the second planetary gear set and the third member of the first planetary gear set;
    a second torque-transmitting mechanism selectively engageable to establish torque flow between the second member of the second planetary gear set and the third member of the first planetary gear set; the first and second torque-transmitting mechanisms thereby providing two different speed ratios between the input member and the third member of the first planetary gear set; and
    at least one controller operable to control engagement of the torque-transmitting mechanisms and the motor/generators so that the transmission thereby establishes a first input-split electrically-variable operating mode when the first torque-transmitting mechanism is engaged, the engine is on, and the motor/generators function as motors or generators, and a second input-split electrically-variable operating mode when the second torque-transmitting mechanism is engaged, the engine is on, and the motor/generators function as motors or generators, the first and second input-split electrically-variable operating modes having different gear ratios between the input member and the first planetary gear set.

15. The transmission of claim 14, wherein the first member of the first planetary gear set is a sun gear member, the second member of the first planetary gear set is a ring gear member, and the third member of the first planetary gear set is a carrier member that supports pinion gears that mesh with the sun gear member and the ring gear member; and
    wherein the first member of the second planetary gear set is a carrier member, the second member of the second planetary gear set is a sun gear member, and the third member of the second planetary gear set is a ring gear member; wherein the carrier member supports pinion gears that mesh with the sun gear member and the ring gear member.

16. A transmission comprising:
    an input member;
    an output member;
    a stationary member;
    a first and a second planetary gear set each having a first member, a second member and a third member;
    a power-split unit including the first planetary gear set and having:
        a first electric motor/generator having a first rotor connected for rotation with the first member of the first planetary gear set and a first stator grounded to the stationary member;
        a second electric motor/generator having a second rotor connected for rotation with the second member of the first planetary gear set and a second stator grounded to the stationary member; wherein the second member of the first planetary gear set is connected for common rotation with the output member;
    a ratio-changing unit including the second planetary gear set and having:
        a first torque-transmitting mechanism selectively engageable to establish torque flow between the first member of the second planetary gear set and the third member of the first planetary gear set;
        a second torque-transmitting mechanism selectively engageable to establish torque flow between the second member of the second planetary gear set and the third member of the first planetary gear set; the first and second torque-transmitting mechanisms thereby providing two different speed ratios between the input member and the third member of the first planetary gear set; wherein the first member of the second planetary gear set is connected for common rotation with the input member; wherein the third member of the second planetary gear set is grounded to the stationary member;
    wherein the first member of the first planetary gear set is a sun gear member, the second member of the first planetary gear set is a ring gear member, and the third member of the first planetary gear set is a carrier member that supports pinion gears that mesh with the sun gear member and the ring gear member;

wherein the first member of the second planetary gear set is a carrier member, the second member of the second planetary gear set is a sun gear member, and the third member of the second planetary gear set is a ring gear member; wherein the carrier member supports pinion gears that mesh with the sun gear member and the ring gear member; and wherein each of the torque-transmitting mechanisms is engaged at respective different predetermined operating conditions selected so that speeds of the first and second rotors remain within a predetermined range of speeds.

* * * * *